Dec. 1, 1953

A. WOLF 2,661,464

METHOD AND APPARATUS FOR RECORDING
DIP OF GEOLOGICAL STRATA

Filed April 8, 1949

3 Sheets-Sheet 1

INVENTOR.
Alfred Wolf

BY

Kenyon & Kenyon
ATTORNEYS

INVENTOR.
Alfred Wolf
BY
Kenyon & Kenyon
ATTORNEYS

Patented Dec. 1, 1953

2,661,464

UNITED STATES PATENT OFFICE 2,661,464

METHOD AND APPARATUS FOR RECORDING DIP OF GEOLOGICAL STRATA

Alfred Wolf, Tulsa, Okla., assignor to Geophysical Research Corporation, New York, N. Y., a corporation of New Jersey Application April 8, 1949, Serial No. 86,248

6 Claims. (Cl. 340—15)

This invention relates to geophysical exploration by reflection seismic methods. An object is to continuously indicate the dip of geological strata from which reflections are obtained. Another object is to continuously record dip on the seismograph record by a separate trace or curve indicating by its contours or position the angle of dip of strata indicated simultaneously by the usual geophone traces or curves. Other objects may be inferred from the following.

Figure 1:
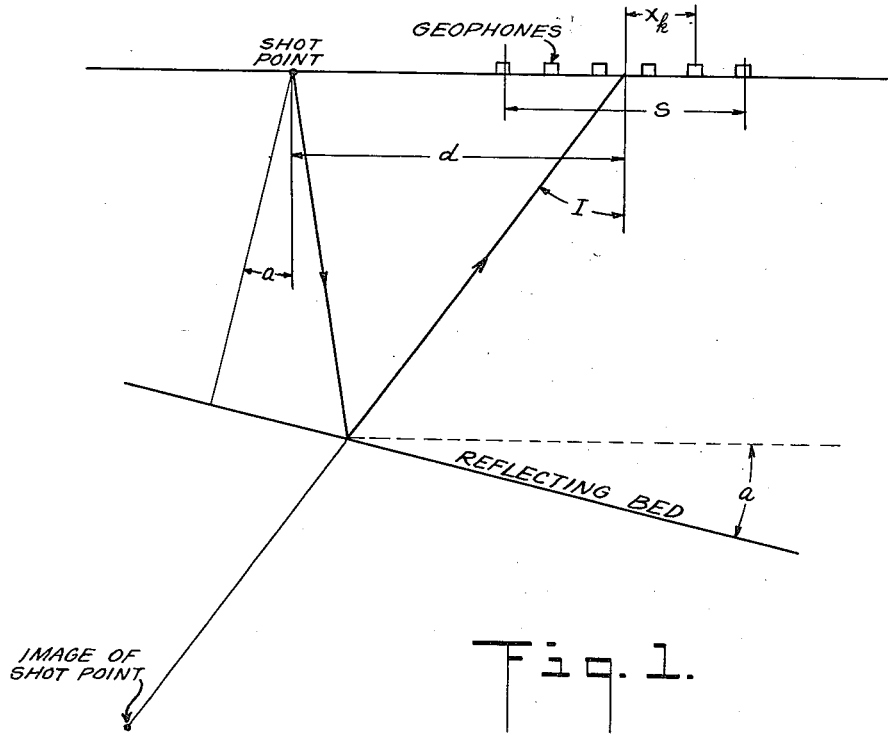
Figure 2:
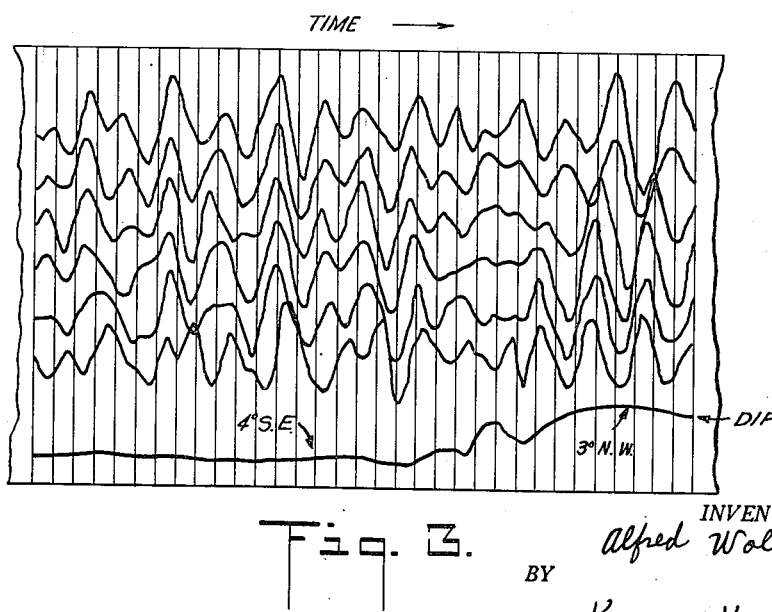
Figure 2:
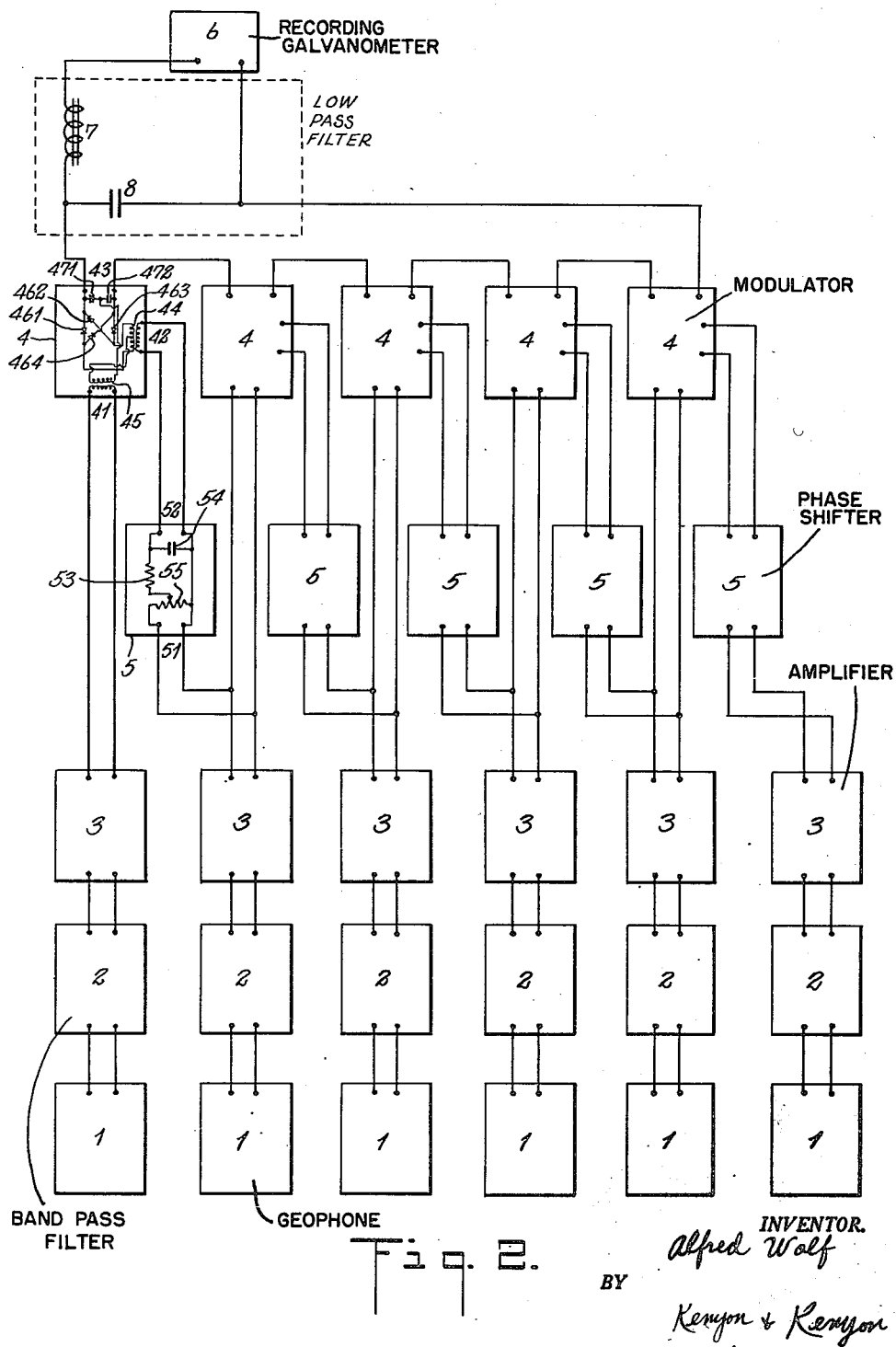
Figure 4:
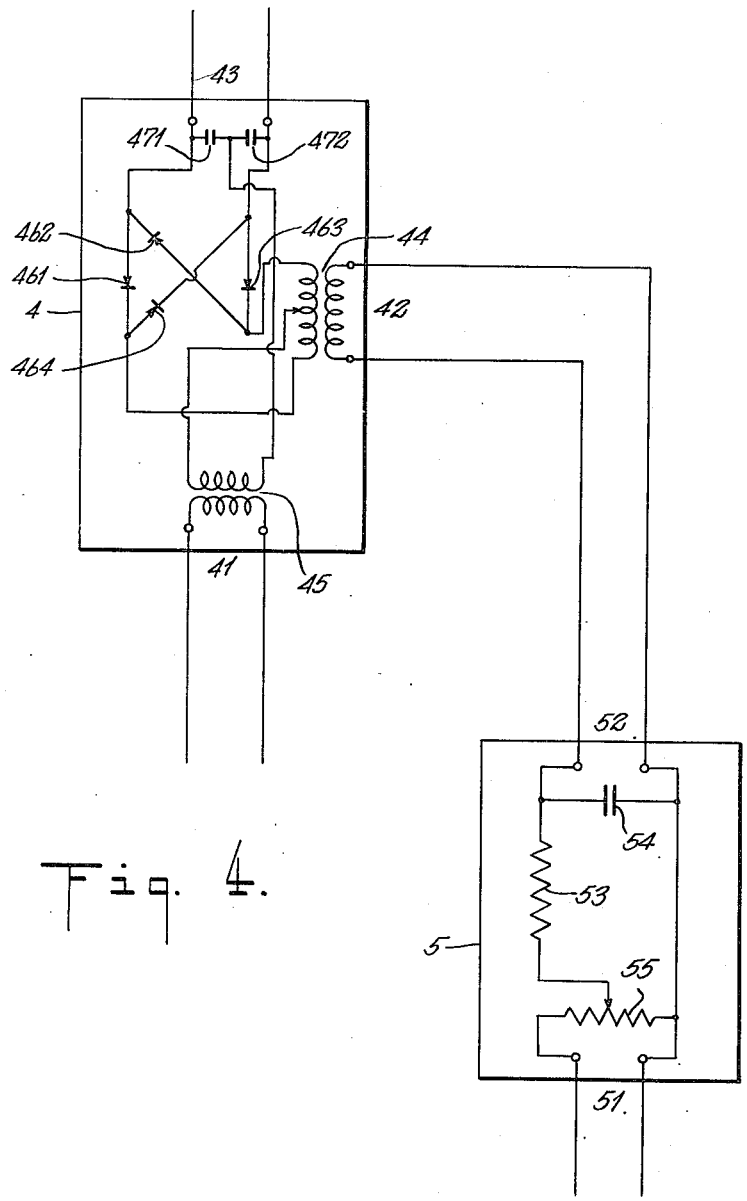

The principles, nature and operation of the invention are described with the aid of the accompanying drawings in which:

Fig. 1 schematically shows the shooting of a reflection profile;

Fig. 2 diagrammatically shows electrical apparatus embodying the invention;

Fig. 3 shows a portion of a seismograph record including an example of the trace indicating dip, the latter trace being produced by the method and apparatus of this invention; and Fig. 4 is an enlargement of a portion of Fig. 2 to facilitate its examination.

The invention is adapted to be practiced in conjunction with the shooting of the usual seismic reflection profiles. The invention may make use of ordinary seismic equipment to which is added some special apparatus. Directly, the invention provides means for recording the angle of incidence of seismic reflections at the center of the geophone set-up. This angle provides a good measure of the angle of dip of subsurface geological strata, and, under certain conditions, is proportional or equal to the angle of dip. Hence, the records obtained in the practice of this invention furnish valuable information for the interpretation of the subsurface geology of the prospected area.

To make the principle of the invention more clearly understood, it is desirable to review the method of computation of dip angles of geological strata from the usual reflection records. Mathematical formulae employed in such calculations will be given in a form suitable for use further on.

Referring now to Fig. 1, a charge of explosive is planted at the shot point, and a set of geophones (six in Fig. 1) is placed on the surface of the earth in line with the shot point; each geophone being connected by means of an electrical cable to recording apparatus. The term geophone is intended to embrace all electrical detectors used in seismic work to obtain an electrical response from the earth vibrations. The geophones are usually placed at equal distances, but the general formulae given below may be applied in the most general case of arbitrary geophone spacing, providing the center of the geophone spread is understood to mean a more general term, namely, the center of gravity of geophone positions.

The center of gravity of geophone positions is defined as a point such that $$\Sigma\, x_k = 0$$

where the $x$'s are geophone coordinates with respect to the center of gravity. If the coordinates of the geophones with respect to the shot-point are denoted $y_k$, the coordinate of the center of gravity with respect to the shot point is $$\frac{1}{n}\Sigma y_k$$

where $n$ is the total number of geophone positions. This point is called the center of gravity of geophone positions since it is the true center of gravity of the geophones when they have equal weight. Both the $x$'s and the $y$'s may be positive and negative.

Example: (East positive, West negative)
  G1 500 ft. E of shot point, $y_1 = 500$
  G2 at shot point, $y_2 = 0$
  G3 500 ft. W of shot point, $y_3 = -500$
  G4 800 ft. W of shot point, $y_4 = -800$ The center of gravity is located at $$\tfrac{1}{4}(500+0-500-800) = -200 \text{ ft.}$$

which means that it is 200 ft. west of the shot point. Therefore, having $$x_1 = 700,\ x_2 = 200,\ x_3 = -300,\ x_4 = -600$$

the sum of the $x$'s is zero.

The distance from the shot point to the center of the geophone spread is denoted $d$, and the total geophone spread $s$. The coordinates of the geophones, $x_k$, are measured from the center of the geophone spread.

A shot is fired at the shot point, and the motion of the earth is recorded by the geophones and the usual equipment attached to them. From the record of motion obtained, the time of reflection, $t_k$, from some reflecting bed is noted for each geophone position. When the depth of the reflecting bed is sufficiently great, which is usually the case, the angle of incidence $I$ of the reflected waves at the center of the geophone spread is computed with the aid of the equation.

$$\sin I = \frac{V \Sigma x_k t_k}{\Sigma x_k^2} \qquad (1)$$

in which the sums are extended over all the geophones, and V is the velocity of seismic waves in the earth. The angle of dip $a$ of the reflecting bed is given by $$\tan a = \tan I - d/Vt \cos I \quad (2)$$

where $t$ is the average reflection time. It is apparent that the angle of incidence $I$ is equal to the angle of dip $a$ when $d=0$, i. e., when the center of the geophone setup is at the shot point. When dips of geological strata are to be determined with accuracy, a balanced geophone spread on two sides of the shot point is usually used. It is in such instances that $d=0$, and the angle of incidence may be taken as a measure of dip.

Because of the relation $$\Sigma x_k = 0$$

which is satisfied for arbitrarily spaced geophones, Equation 1 may be transformed into a form which will be employed subsequently, namely $$\sin I = V \frac{\Sigma S_k (t_k - t_{k+1})}{\Sigma x_k^2} \quad (3)$$

in which the sum in the numerator is extended over the $n-1$ time differences, $t_k - t_{k+1}$, each multiplied by $$S_k = x_1 + x_2 + \ldots x_k$$

while the denominator is the same as that of Equation 1.

In concluding this review of the method of dip calculation, we finally note the formula applicable only to a setup of two geophones $$\sin I = V \frac{(t_2 - t_1)}{s} \quad (4)$$

when the first geophone has the negative coordinate referred to the center of the two geophone positions.

By inspection of Equation 3, it may be seen that the angle of incidence $I$ can be recorded if a method is devised to obtain an electric current or voltage proportional to the time difference $t_k - t_{k+1}$ between adjacent geophones in such a way that all the currents or voltages obtained can be added to give a result proportional to the right-hand side of Equation 3.

In Fig. 2, there are shown six geophones 1, but any arbitrary plural number $n$ may be employed. Each geophone shown may actually consist of a number of identical detectors connected in series or parallel to the same recording channel. The output of each geophone passes through the associated electrical band pass filters 2, to the input of an automatic volume control amplifier 3. The pass band of the filters 2 should coincide with reflection frequencies, and should preferably be much narrower than the usual band employed in reflection shooting; for example, the pass band may be from 35 C. P. S. to 45 C. P. S. The automatic volume control amplifiers 3 should be adjusted in such manner that their output voltages are independent of input voltages over a wide range of input voltage amplitudes, and also so that the magnitude of the output voltages of all the amplifiers 3 be the same. Because of this condition and because of the relatively narrow band of frequencies passed by the filters 2, the output voltages of the amplifiers 3 will differ only in phase.

The output terminals of the six amplifiers 3 are connected to the five balanced modulators 4 and to the five phase shifters 5, which include the adjustable potentiometers 55. In general, the number of the modulators and the number of the phase shifters is one less than the number of amplifiers. All of the modulators are constructed alike and so are all the phase shifters, so the drawing shows the respective constructions only once in each instance.

The balanced modulators 4 are described in an article of R. S. Caruthers in the Bell System Technical Journal, vol. 18, 1939, p. 318, Fig. 2c. The arrangement of the modulators incorporated in this invention differs but little from that shown by Caruthers. The carrier input terminals 41 are connected to the transformer 45. The signal input terminals 42 are connected to the transformer 44 which has a center tapped secondary. Two equal condensers 471 and 472 in series are placed across the modulator output terminals 43. 461, 462, 463, 464 are a set of four balanced rectifiers, which may be of the copper oxide type or of the thermionic diode type; connected to form a bridge network. The connections are made in such manner that the rectifiers form a ring.

The potentiometer 55 is connected across the input terminals 51 of the phase shifter 5. The series resistor 53 has a value which is great compared to the value of the resistance of the potentiometer 55, such as from 5 to 10 times as great. The impedance of the condenser 54, placed across the output terminals 52, has a magnitude which, at the frequencies passed by the filter 2, is small as compared to the resistance of 53. For example, this ratio may be made 1:100. The arrangement of the phase shifter 5 is such that the phase of the voltage across the output terminals 52 is 90° behind the phase of the voltage applied to the input terminals 51. Moreover, it should be noted that the magnitude of the voltage across 52 is much smaller than the magnitude of the voltage at the input terminals 51.

The voltage output at 52 is determined by two factors: The ratio of the impedance of 54 to the resistance 53 and the setting of the potentiometer. As stated previously, the ratio of 54 to 53 might be 1:100; the potentiometer setting would introduce an additional factor of the order of 1:2; the total ratio would thus be 1:200. Of course, these numbers are arbitrary; it all depends on the accuracy desired. If satisfied with a less accurate phase shift network, the ratio of 54 to 53 might be made 1:30, and then the total ratio of the voltage output at 52 to the input at 51 would be 1:60; and this would probably be fairly satisfactory.

The output voltages of the first five amplifiers 3 are respectively connected individually to the carrier input terminals 41 of the individual modulators 4. In general, for an arbitrary number $n$ of amplifiers, the first $n-1$ amplifiers are connected respectively to the carrier input terminals 41 of the $n-1$ modulators provided by this invention. The output voltages of the last $n-1$ amplifiers (five in Fig. 2) are connected respectively to the input terminals 51 of the $n-1$ phase shifters 5 provided by this invention. The output terminals 52 of the $n-1$ phase shifters 5 are connected respectively to the $n-1$ signal input terminals 42 of the $n-1$ modulators 4.

The result of the connections described above is, as can be seen in Figure 2, that each of the modulators 4 receives voltages from two adjacent amplifiers, which in turn receive the output voltages of two adjacent geophones or (if multiple geophones are used) groups of geophones. The carrier input terminals of each of the modulators 4 receive the output of their connected amplifier 3 unchanged. The voltage applied to the signal input terminals of a modulator 4 is the output of an amplifier 3 which is shifted in phase by 90° and reduced in amplitude by a phase shifter 5.

The output terminals of the modulators 4 are all connected in series with each other and in series with the choke 7 and the recording galvanometer 6. The filter condenser 8 is placed across all the modulator terminals. The function of the choke 7 and the condenser 8 is to eliminate high frequencies from the galvanometer 6, and allow it to record only frequencies much lower than the frequencies passed by the filters 2. The frequencies passed by the combination of the choke 7 and the condenser 8 are related to the width of the band of frequencies passed by the band pass filters 2. If the width of the band is 10 cycles/sec., e. g. filter 2 passes 40 C. P. S. to 50 C. P. S., the choke condenser combination should pass frequencies from zero to 10 C. P. S. The exact frequency band is not important, and might be designed to pass 0 to 7 C. P. S., for example.

The method of operation of this invention and the adjustment of the apparatus will now be explained. Let there be $n$ geophones or groups of geophones in the reflection profile setup. The geophones should be numbered 1 to $n$ in the order of their distance from one end of the setup. Consecutive numbers will then correspond to adjacent geophones. The $n$ amplifiers 3 of Fig. 2 are numbered so that each amplifier is connected to a same numbered geophone. The modulators 4 are numbered in such a way that the carrier input terminals 41 of each modulator are connected to a same numbered amplifier. The phase sifters 5 are similarly numbered in such manner that the output of each phase shifter is connected to the signal input terminals of the same numbered modulator. The input of the $k$'th phase shifter is then connected to the output of the $k+1$ amplifier. It follows that the $k$'th modulator receives signals from the adjacent geophones numbered $k$ and $k+1$. The description will be much clarified by reference to Fig. 2.

The apparatus is adjusted by applying equal voltages from external sources to the phase shifter input terminals 51 of Fig. 3, and adjusting each potentiometer 55 in such a way that the output voltage of the corresponding phase shifter measured at its output terminal 52 is proportional to the quantity $S_k (= x_1 + x_2 \ldots + x_k)$ which appears in Equation 3. The output of the $k$'th phase shifter is thus proportional to $S_k$ when voltages of equal magnitude are applied to the input terminals of all phase shifters. For example, when six equally spaced geophones are employed, the output voltages of the five phase shifters are in the ratio 1.0:1.6:1.8:1.6:1.0.

The theory of operation of the apparatus of Fig. 2 will now be explained. After passing through the narrow band pass filters 2, all tuned to the same frequency, the output of the geophones 1 will become substantially sinusoidal. The only differences between the outputs of the various band pass filters 2 will be in their amplitudes and phases. The output of the filters 2 is applied to the automatic volume control amplifiers 3, all adjusted to give equal output voltages. It follows that the output voltages of amplifiers 3 are of the same amplitude, and, being also of the same frequency and sinusoidal, they differ only in phase which may vary slowly with time. Hence, the voltage output of the $k$'th amplifier may be written as $$e \sin \omega(t - t_k) \quad (5)$$

where $e$ is the amplitude (of the order of 1 to 10 volts), and is independent of the index $k$, $t_k$ corresponds to reflection time, and $\omega/2\pi$ is a frequency at the midpoint of the band of frequencies passed by the filters 2. The reflection time in (5) is not absolutely constant but varies slowly with time just as the reflection time $t_k$ in Equation 3 varies along the usual reflection record. The voltage input into the $k$'th phase shifter is then $$e \sin \omega(t - t_{k+1})$$

and consequently, the output may be written $$u S_k e \sin [\omega(t - t_{k+1}) - 90°] \quad (6)$$

where $u S_k$ is a small number of the order of the ratio of the impedance of condenser 54 of the phase shifter 5 to the resistance of its resistor 53. As further explanation, the voltage put out by the amplifier goes to the potentiometer 55 which is adjusted to give a factor proportional to $S$, and is also reduced in the ratio of the impedance of 54 to the resistance 53. The ratio of 54 to 53 is the same for all amplifiers, but the factor proportional to $S_k$ is not the same. Therefore, the voltage $e$ which is applied to 51 gives a voltage output at 52 proportional to $S_k$. The voltage $u S_k e$, where $u$ is some factor determined by impedances and geophone distances, is denoted to make it evident that the voltage output is adjusted to be proportional to $S_k$; $u S_k$ is a small number because the ratio of the impedance of 54 to the resistance 53 is small. The phase shift of 90° is obtained because the voltage across the condenser 54 is 90° out of phase with the current, which, in turn, is in phase with the voltage applied to 51 because the resistance of 53 is great compared to the impedance of 54.

The number $u S_k$ is of the order of 0.01. The factor $S_k$ is included in the Expression 6 because of the adjustment of the potentiometer 55. The phase shift of 90° is due to the action of the condenser 54. It follows that the signal input terminals 42 of the $k$'th modulator 4 receive the voltage given by Expression 6, and the carrier input terminals of the same modulator receive the voltage given by Expression 5. Under the conditions stated, the output of the $k$'th modulator consists of voltage of twice the frequency of the applied voltages, and of direct current. The high frequency voltage output is kept from entering the galvanometer 6 by the choke 7 and the condenser 8, and need not be considered any further. The direct current output of the $k$'th modulator is proportional to the product of the amplitude of Expression 6 and the cosine of the phase difference between 5 and 6. Hence the direct current output of the $k$'th modulator may be written $$e v S_k \sin \omega(t_k - t_{k+1}) \quad (7)$$

where $v$ is of the same order of magnitude as $u$ in Expression 6. If the spacing of the geophones is sufficiently small for $$\omega(t_k - t_{k+1}) \ll 1$$

then Expression 7 may be replaced with sufficient accuracy by $$e v S_k \omega (t_k - t_{k+1}) \quad (8)$$

as the output voltage of the $k$'th modulator. The permissible geophone spacing depends to some extent on the accuracy required and on the magnitude of the dip angle which is likely to be found in the prospected area, the frequency of the reflection band, and the velocity of seismic waves in the area. Assuming 40 C. P. S. for reflection frequency, 10,000 ft./sec. for velocity, a geophone spacing of 200 ft. should be satisfactory for angles of dip up to 10°. The direct current is not strictly constant but varies slowly with time. The sum of the output voltages of the $n-1$ modulators is clearly proportional to $$\Sigma S_k(t_k - t_{k+1})$$

and, hence, it is proportional to the right-hand side of Equation 3 for the angle of incidence of the reflected energy at the center of the geophone spread. It follows that the galvanometer 6 gives a record which is a measure of the angle of dip of the subsurface geological strata.

To persons skilled in the art of electronics and of seismic prospecting, it will be obvious that various modifications may be made in the apparatus, and various devices added to it to improve its performance. For instance, phase shift networks may be incorporated in all channels to provide a simple method of equalizing. A modification of a somewhat different nature would be the replacement of the automatic volume control amplifiers 3 by linear amplifiers and voltage limiter circuits well known in the radio art. Such circuits are described by A. Hund in his treatise on "Frequency Modulation," New York 1942, on pp. 209–212.

In the art of seismic prospecting there is, at the present time, no fixed rule for selecting reflections from records of earth motion. The selection is generally based on a number of factors such as amplitude, phase, frequency content, and others. Hence, it may, under circumstances, be desirable to adjust the filters 2 of Figure 2 provided by this invention to pass various frequency bands not necessarily coincident with the band of maximum reflection energy. It may also be advisable to provide more than one system of the kind described, with the filters adjusted to pass various frequency bands, and make records of them either separately or in combination.

In the above description of the operation of this invention, the term "adjacent geophones" is employed. It is not implied that such geophones must necessarily be adjacent but only that it is preferable that they be as close to each other as practicable. The essential condition to be fulfilled is that the phase difference between the output voltage of geophones referred to as "adjacent geophones" be sufficiently small.

It is preferred that the string of geophones should be aligned with the shot point. The first geophone closest to the shot point has its AVC amplifier output connected with the carrier input of one modulator. The immediately succeeding or second geophone has its AVC amplifier output connected through a 90° phase shifter with the signal input of this same modulator. As a matter of convenience the second geophone amplifier output may also be connected directly with the carrier input of a second modulator and of course without going through a phase shifter. A separate but proximate geophone with a filter and AVC amplifier could also be used in each instance. Then the third of the geophones may have its AVC amplifier connected through another 90° phase shifter with the signal input of this second modulator. Such arrangements are repeated until the last geophone which has its AVC amplifier output connected only through a 90° phase shifter with the signal input of the modulator having its carrier input connected with the AVC amplifier of the geophone next to this last geophone.

With the ratios of the outputs of the phase shifters adjusted as described, or substantially in that order, and with the outputs of the series of modulators added by being connected in series with the recorder and filtered to cut out frequencies passed by the filters 2 while passing substantially lower frequencies, the recorder then provides the trace indicating the angle of incidence of the seismic waves picked up by the geophone string. This angle is oriented respecting the geophone alignment. This record is obtained continuously when the recording galvanometer is used. It is preferably included as part of the usual seismograph record so it is possible to detect when the recorded trace results from random vibration and when it results from reflections. This is possible when the geophones used are the usual geophones used to make the reflection record and all the traces are simultaneously recorded with the new dip trace obtained from one of the galvanometers of the string in the usual equipment. Then the dip trace portions opposite the usual trace portions indicating reflections, indicates the dip of strata thus shown by the latter traces.

As suggested the recording galvanometer 6 may be one of the multiple string galvanometers recording on the strip in the usual recording camera. Preferably one is used that is offset from those used to record the usual geophone response traces. When this is done the usual record contains the additional trace legended "dip" in Fig. 3. Note that some of the easily detectable reflections are shown by the dip trace as being from strata having the same dip but that the dip is indicated as having a different angle in the case of other reflections. If dip is not calculated for all a presumption of regular or uniform dip might arise. To save time the dip of only a few might be calculated if the dip trace was absent. But its presence indicates the need for further dip calculations, and the dip trace is of value for this reason alone. However, the dip trace may be used to indicate the angle of dip continuously by calculating dip for one or a few reflections and using this as a base for direct determinations for other reflections by the position or curve of the dip trace opposite these reflections. Or with suitable calibration a base line could be included on the record for direct reading purposes.

I claim:

1. Seismic prospecting apparatus including a plurality of geophones adapted to be arranged at spaced intervals in a straight line aligned with a shot point, a modulator for each of said geophones excepting the last one thereof with the carrier input of each of said modulators connected with the output of the one of said geophones associated therewith, a 90° phase shifter for each of said geophones excepting the first one thereof with the signal input of each of said modulators connected through the modulator of each geophone connected with the output of the following geophone through the phase shifter associated with the latter, a recording indicator with the outputs of said modulators connected therewith in series with each other, and a filter for said indicator and through which said modulator outputs are connected and which passes only frequencies lower than the usual seismic reflection vibration frequencies.

2. Apparatus as defined by claim 1 with said phase shifters including means for adjusting the input voltages to said modulators from said place shifters according to the spacing and relative locations of said geophones.

3. Seismic prospecting apparatus including a plurality of geophones adapted to be arranged at spaced intervals in a straight line aligned with a shot point, a modulator for each of said geophones excepting the last one thereof with the carrier input of each of said modulators connected with the output of the one of said geophones associated therewith, a 90° phase shifter for each of said geophones excepting the first one thereof with the signal input of the modulator of each geophone connected with the output of the following geophone through the phase shifter associated with the latter, a recording indicator with the outputs of said modulators connected therewith in series with each other, and a filter for said indicator and through which said modulator outputs are connected and which passes only frequencies lower than the usual seismic reflection vibration frequencies, each of said geophones having a band pass filter and an automatic volume control amplifier through which its output passes, said filter having a narrow pass band in the reflection frequency band.

4. Seismic prospecting apparatus including a plurality of geophones adapted to be arranged at spaced intervals in a straight line aligned with a shot point, a modulator for each of said geophones excepting the last one thereof with the carrier input of each of said modulators connected with the output of the one of said geophones associated therewith, a 90° phase shifter for each of said geophones excepting the first one thereof with the signal input of the modulator of each geophone connected with the output of the following geophone through the phase shifter associated with the latter, a recording indicator with the outputs of said modulators connected therewith in series with each other, and a filter for said indicator and through which said modulator outputs are connected and which passes only frequencies lower than the usual seismic reflection vibration frequencies, each of said geophones having a band pass filter and an automatic volume control amplifier through which its output passes, said filter having a narrow pass band in the reflection frequency band, said phase shifters including means for adjusting their output voltages according to the spacing and relative locations of said geophones.

5. Seismic prospecting apparatus including a plurality of geophones adapted to be strung in a straight line and means for recording continuously the angle of incidence of seismic waves affecting said geophones generated by a single impulse applied to the earth, said means including systems associated with successive pairs of said geophones and each adapted to produce electrical responses substantially proportional to phase differences in the responses of said pairs of geophones, means for electrically combining said responses of said systems to provide an electrical summation thereof and means for recording continuously said summation.

6. Seismic prospecting apparatus including a plurality of geophones adapted to be strung in a straight line and means for recording continuously the angle of incidence of seismic waves affecting said geophones generated by a single impulse applied to the earth, said means including the combination of a modulator having its carrier input connected with one of said geophones, a phase shifter with another of said geophones connected therethrough with the signal input of said modulator and an indicator operated by the output of said modulator.

ALFRED WOLF.

References Cited in the file of this patent

UNITED STATES PATENTS

| Number | Name | Date |
|---|---|---|
| 2,087,702 | Peters | July 20, 1937 |
| 2,184,313 | Owen | Dec. 26, 1939 |
| 2,215,297 | Owen | Sept. 17, 1940 |
| 2,266,041 | Hoover | Dec. 16, 1941 |
| 2,279,191 | Adler | Apr. 7, 1942 |
| 2,294,627 | Parr | Sept. 1, 1942 |
| 2,427,421 | Rieber | Sept. 16, 1947 |
| 2,473,469 | Dahm | June 14, 1949 |
| 2,477,844 | Wolf | Aug. 2, 1949 |
| 2,520,297 | Anderson | Aug. 29, 1950 |